(12) United States Patent
Behrens

(10) Patent No.: US 7,302,903 B1
(45) Date of Patent: Dec. 4, 2007

(54) FLOATING VESSEL FOR PRODUCING HYDROCARBONS AND METHOD FOR PRODUCING HYDROCARBONS

(76) Inventor: Rudolph Behrens, 254 Liberty Ct., Collegeville, PA (US) 19426

( * ) Notice: Subject to any disclaimer, the term of this patent is extended or adjusted under 35 U.S.C. 154(b) by 0 days.

(21) Appl. No.: 11/189,430

(22) Filed: Jul. 25, 2005

Related U.S. Application Data

(60) Provisional application No. 60/590,731, filed on Jul. 23, 2004.

(51) Int. Cl.
  *B63B 35/44* (2006.01)
  *C07C 27/00* (2006.01)
  *C07C 27/06* (2006.01)

(52) U.S. Cl. .................. 114/264; 518/702; 518/704

(58) Field of Classification Search .......... 114/264, 114/265, 74 R, 256; 290/55
  See application file for complete search history.

(56) References Cited

U.S. PATENT DOCUMENTS

| | | | | |
|---|---|---|---|---|
| 3,444,693 A | * | 5/1969 | Busey | 405/27 |
| 4,134,732 A | * | 1/1979 | Jackson | 422/198 |
| 4,282,187 A | * | 8/1981 | Corbett et al. | 422/190 |
| 4,476,249 A | * | 10/1984 | Avery | 518/703 |
| 4,568,522 A | * | 2/1986 | Corbett | 422/186 |
| 2004/0013923 A1 | * | 1/2004 | Molter et al. | 429/25 |

* cited by examiner

*Primary Examiner*—Sherman Basinger
(74) *Attorney, Agent, or Firm*—John F. A. Earley, III; Frank J. Bonini, Jr.; Harding, Earley, Follmer & Frailey

(57) ABSTRACT

A floating vessel 11 for producing hydrocarbons comprises one or more containers 12 having a chamber 13 formed therein, a structural frame 15 for interconnecting the one or more containers 12, a power system 16 for producing, storing, and distributing power, and a hydrocarbon processor 27.

7 Claims, 5 Drawing Sheets

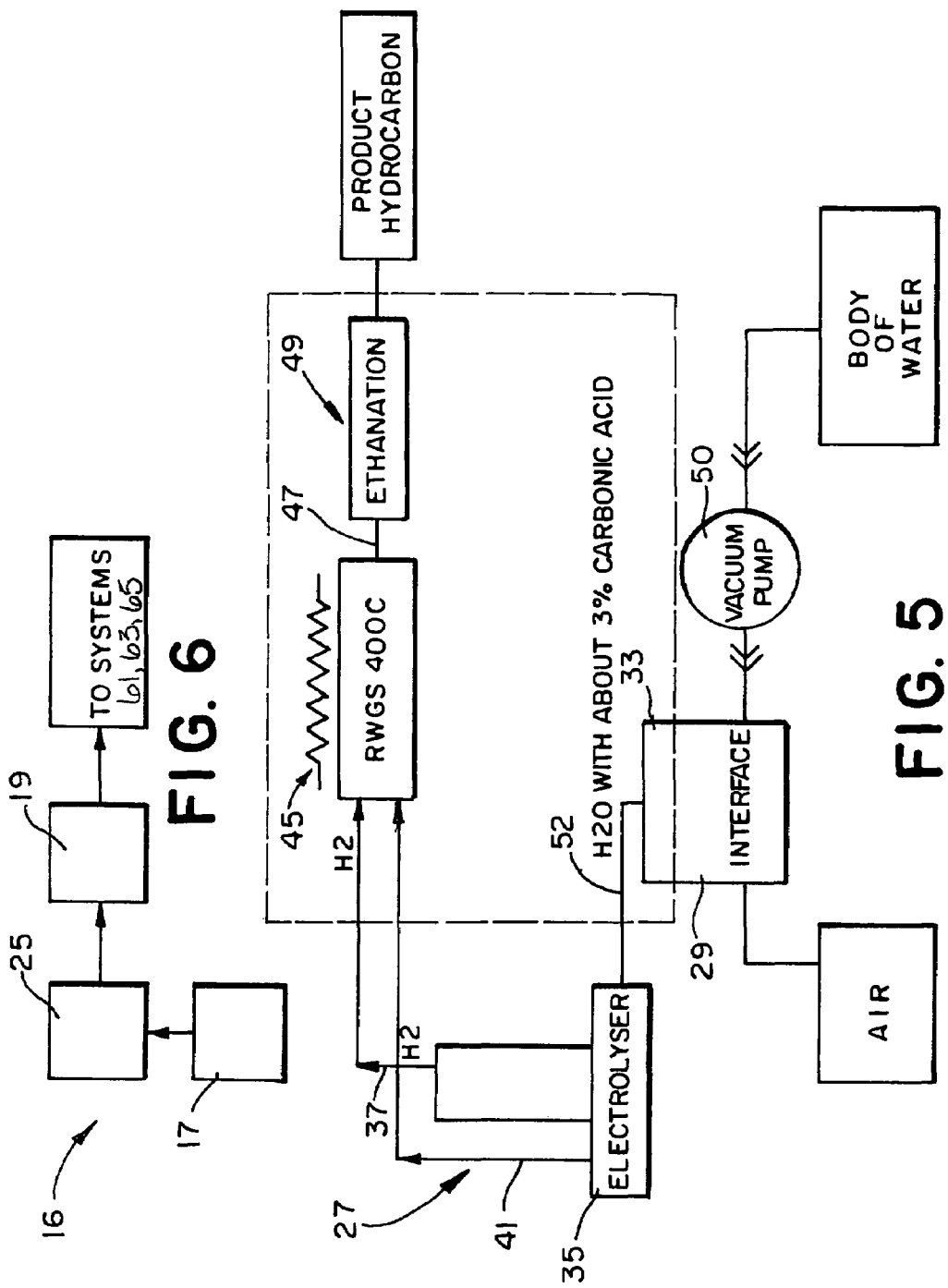

FLOATING VESSEL FOR PRODUCING HYDROCARBONS AND METHOD FOR PRODUCING HYDROCARBONS

This application claims the benefit under 35 U.S.C. Section 119(e) of prior filed provisional application No. 60/590,731 filed on Jul. 23, 2004.

BACKGROUND OF INVENTION

1. Field of the Invention

The present invention relates to the production of hydrocarbons, and more particularly concerns the production of hydrocarbons using air, water and wind energy as raw materials.

2. Brief Description of Prior Art

There is an ongoing erosion of energy generating capacity in North America, especially with respect to base load generating facilities. Base load energy is the least costly energy to produce by power companies. Because of environmental and industry regulation and significant market changes, utilities foresee that base load energy production will not keep pace with demand, therefore requiring the generation of additional energy using other more costly means. This is especially troublesome because base-load energy plants are usually the most costly and time consuming to construct, traditionally being coal, nuclear, heavy oil or hydro-electric plants. Some new combined cycle plants have slightly shorter construction time, but they are still costly to build and are dependant on natural gas or light oil, both fuels with a volatile price history.

The electric utility companies could increase their base-load energy capacity by 30 percent overnight if they use their peak load combustion turbines for base load power. Presently this is not possible because these turbines are simple-cycle gas turbines with a maximum thermal-dynamic efficiency of 25 percent. Additionally, they can only be run for a limited number of hours a day since they do not conform to air pollution standards. Because of these factors, they cannot be run profitably and are used only to make up for small, short term power short falls, as might occur during the morning and evening peak demand times. To operate these plants for base load profitability, in an environmentally clean manner, power producers would require a fuel that does not cause noxious emissions and sells at an economically feasible price. Several fuels possess one or the other of these desired traits, but none possesses both traits.

SUMMARY OF THE INVENTION

It is an object of this invention to provide an unmanned self-propelled robotic vessel that converts wind energy into ethanol or other hydrocarbons by processing sea water and air.

It is another object to provide a clean burning fuel that is economical enough for power companies to generate a profit, by lowering the current costs for using turbines to generate electricity at levels above the base load energy level.

These and other objects are accomplished by my invention which is set out below.

BRIEF DESCRIPTION OF THE DRAWINGS

FIG. 5 is a schematic of the hydrocarbon production process of the invention.

FIG. 6 is a schematic of the electrical power system of the invention.

DETAILED DESCRIPTION OF THE INVENTION

Figure 1:
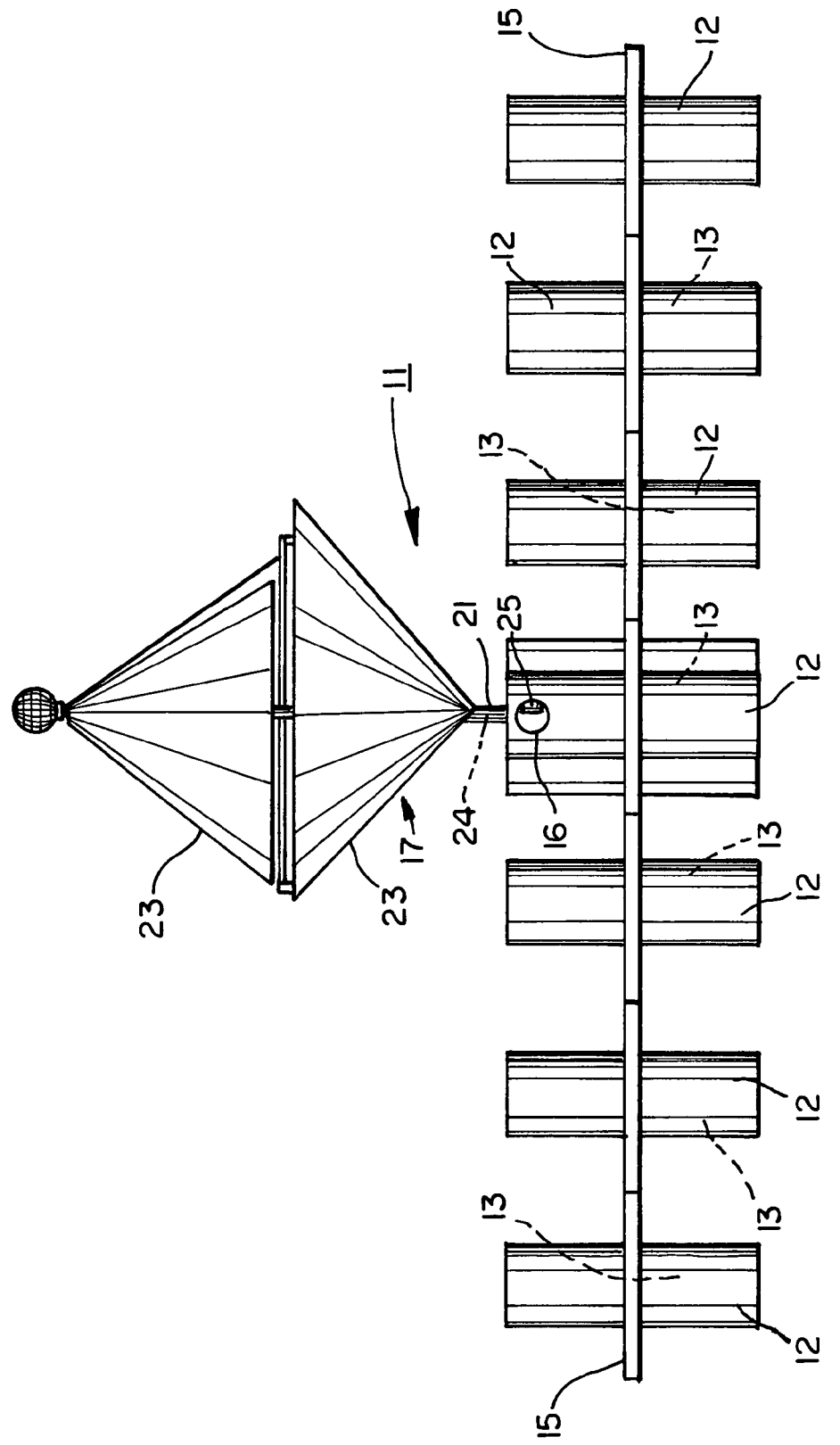
FIG. 1 is a side elevational view of a floating vessel constructed in accordance with the invention, with the structural cables not shown. The structural cables are not shown in FIG. 1 or FIGS. 2-3 so as not to block the view of other components of the vessel. However, the structural cables are shown in FIG. 4.
Figure 2:
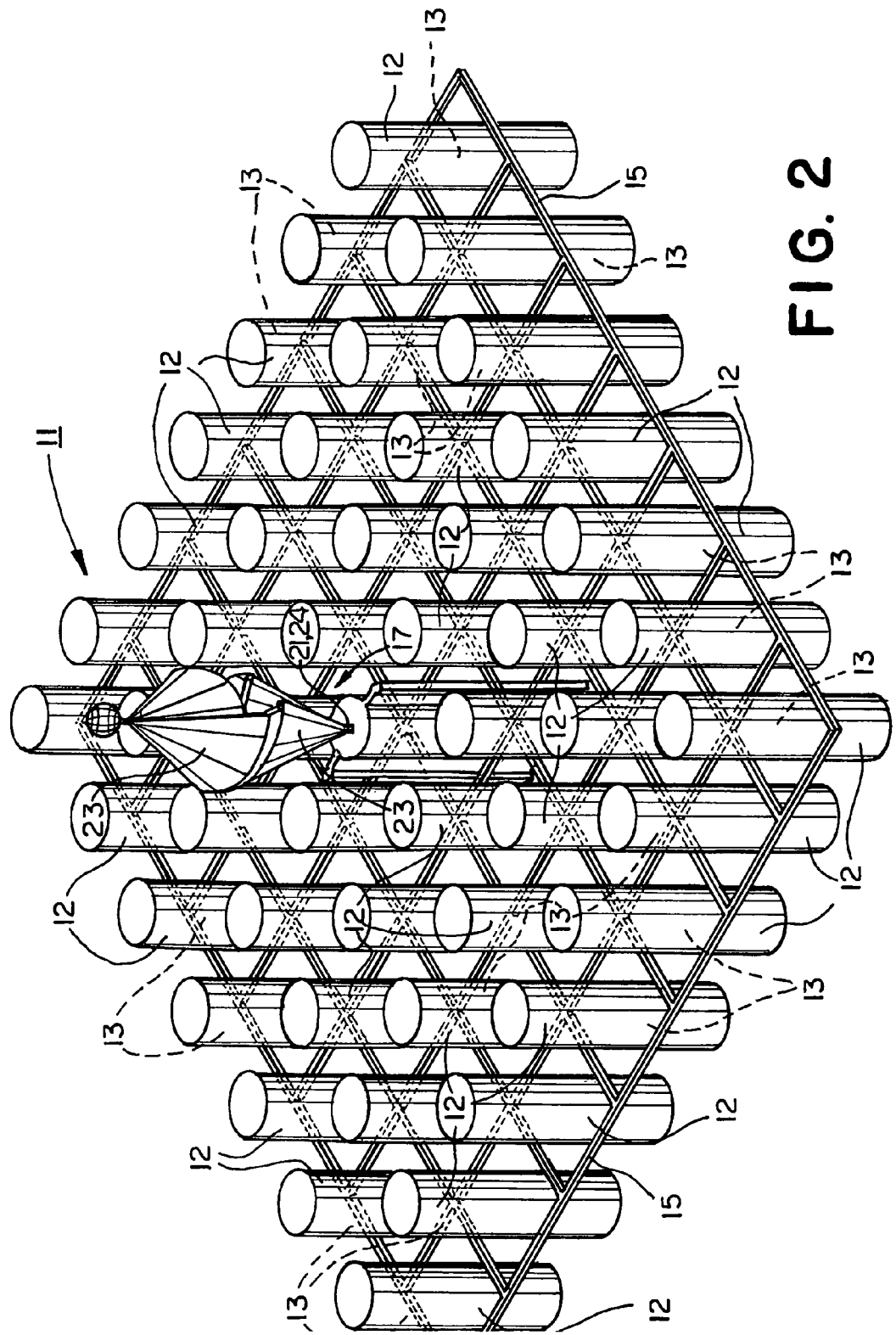
FIG. 2 is a perspective view of the floating vessel of FIG. 1.

Turning to the drawings, there is shown a floating vessel 11 for producing hydrocarbons comprising one or more containers 12 having a chamber 13 formed therein, a structural frame 15 for interconnecting the one or more containers 12, a power system 16 for producing, storing, and distributing power, and a hydrocarbon processor 27.

Figure 4:
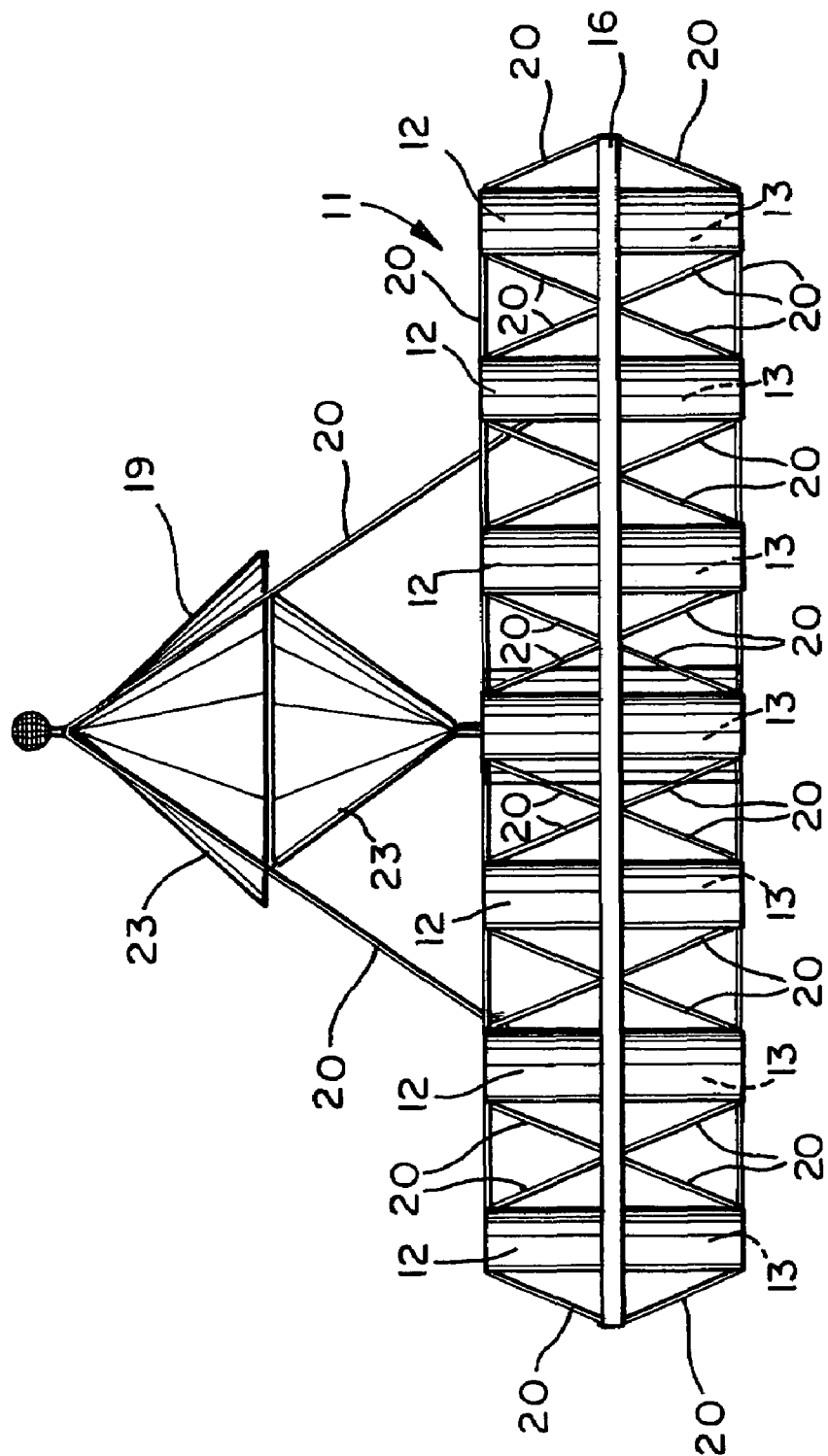
FIG. 4 is a view in side elevation of the vessel of FIGS. 1-3, illustrating the placement of the structural cables.

In the preferred embodiment shown in the drawings, the structural frame 15, using structural-cables 20, as shown in FIG. 4, has a tensigrity structure using a third magnitude octal truss 16 made of aluminum and stainless steel.

Figure 3:
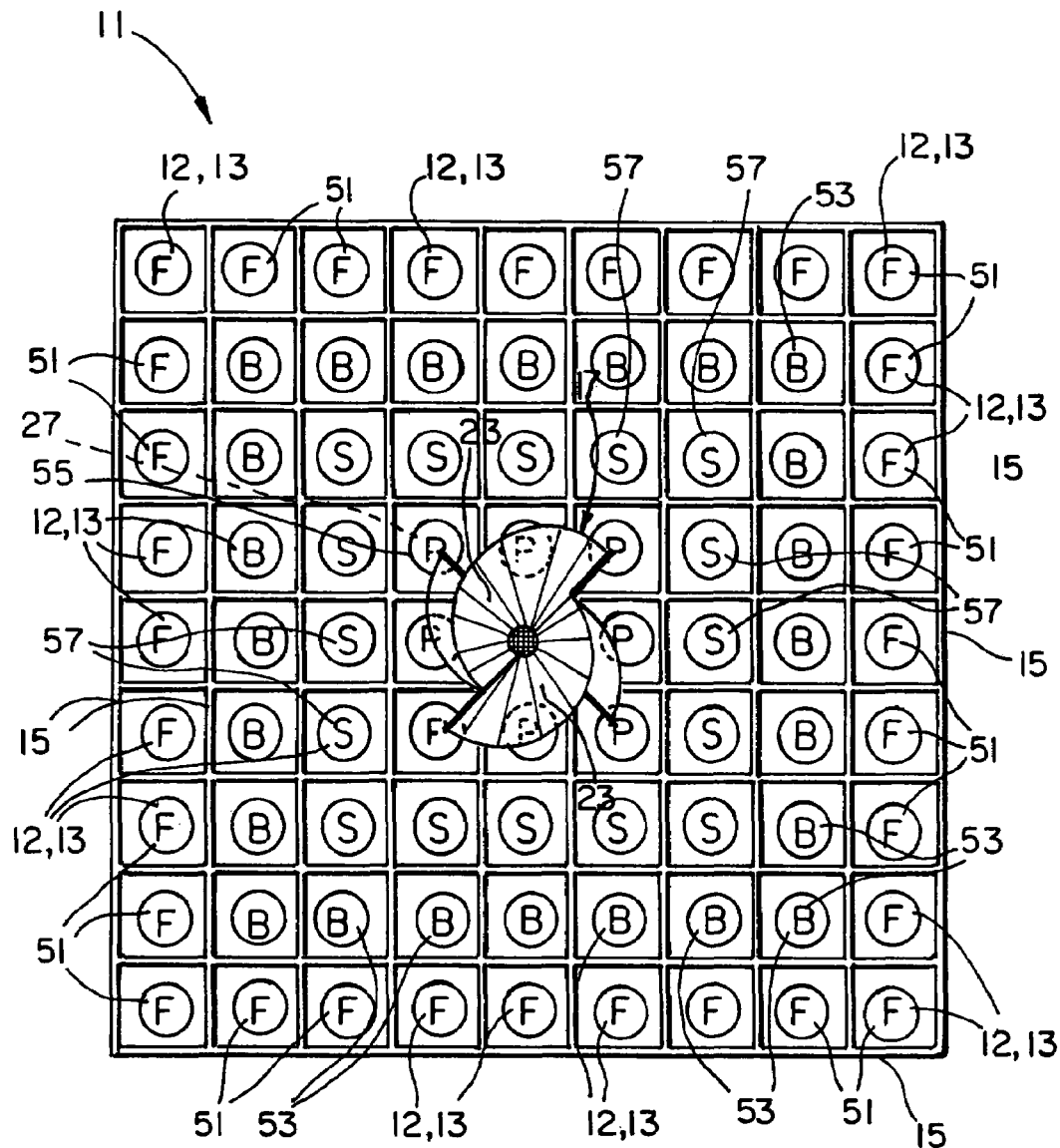
FIG. 3 is a top plan view of the floating vessel of FIG. 1.

In this preferred embodiment, as shown in FIG. 3, vessel 11 has 81 separate containers 12 in a 9×9 array. The chambers 13 of the containers 12 serve, variously, as floatation chambers 51 (also marked with the letter "F" in FIG. 3), ballast chambers 53 (also marked with the letter "B" in FIG. 3), process chambers 55 (also marked with the letter "P" in FIG. 3), and storage chambers 57 (also marked with the letter "S" in FIG. 3). Preferably, the outer containers 12 act as flotation chambers 51 and ballast chambers 53 exclusively to protect the stored hydrocarbon in the event of a collision. Regarding storage, the hydrocarbon produced, such as ethanol, preferably may be stored in flexible bladders that are positioned in storage chambers 57. Preferably, storage chambers 57 are positioned inwardly of ballast chambers 53 and floatation chambers 51, and three containers 12 (a flotation chamber 51, a ballast chamber 53, and a storage chamber 57) must be compromised for ethanol to leak. Moreover, the ethanol would be diluted to 20 percent by the water that the vessel 11 is in, well below flammability and toxicity levels. In this preferred embodiment, the structure is extremely strong, able to withstand 5000 psi, but it only weighs 6 tons empty.

The power system 16 comprises a wind turbine 17, an electrical generator 25, and a power storage and regulation element 19. The wind turbine 17 harnesses the wind energy. The wind turbine 17 has a rotatable shaft 21 and one or more rotor blades 23 connected to the rotatable shaft 21. The rotatable shaft 21 is preferably hollow and is rotatably mounted over a hollow mast 24 of the vessel 11. An electrical generator 25 is mechanically coupled with the rotatable shaft 21 for producing electrical energy when wind blows against the one or more rotor blades 23 causing the rotatable shaft 21 to rotate around the mast 24.

The rotors are cup shaped to catch the wind, and are preferably lined with aluminum, which gives the vessel 11 enhanced radar visibility. Preferably, the rotors 23 are made of soft construction and are slow moving in nature to prevent being a hazard to sea birds. Preferably, the power storage and regulation element 19, which is linked to the generator 25, comprises batteries and a battery charging system, which stores energy from the generator 25.

Disposed within one or more chambers 13 is a hydrocarbon processor 27. The hydrocarbon processor 27 comprises a carbon dioxide interface 29 (shown in FIG. 5) for introducing carbon dioxide to the hydrocarbon processor 27. The processor 27 further, comprises an electrolyzer 35, which is powered by electrical energy from the power storage and regulation element 19, for converting water, via electrolysis, into hydrogen and oxygen for providing a hydrogen effluent stream 37. The processor 27 further comprises a reverse water gas shift (RWGS) reactor 45 adapted to receive the hydrogen effluent stream 37 and the carbon dioxide and oxygen in a stream 41 from the electrolyzer 35, for converting the carbon dioxide and hydrogen in the presence of a catalyst into an RWGS effluent stream 47 comprising carbon monoxide and water. The processor 27 has an ethanation reactor 49 adapted to convert the RWGS effluent stream 47 in the presence of a catalyst into the product hydrocarbon.

In the preferred embodiment of the invention illustrated in the drawings, the vessel 11 is provided with a vacuum pump 50 which draws water from the body of water in which the vessel 11 is located into and through a passageway extending along the central axis of the hollow mast 24 to a flow line 52 leading into the electrolyzer 35. Specifically, the water is drawn up from the body of water using the vacuum pump 50 and taken through the passageway in the mast 24 to the upper end portion of the mast 24, where the water is vaporized through flash distillation. The vaporized water is then condensed and fed to the electrolyzer 35. Preferably, 40 gallons of water per minute is drawn by the vacuum pump 50.

The carbon dioxide interface 29 preferably comprises a chamber 33 that is open to the surrounding air, and the chamber 33 is provided with a vent through which carbon dioxide contained in the air in the chamber 33 is drawn and absorbed into the condensed water being fed into the electrolyzer 35 through line 52.

In the preferred embodiment illustrated herein, the vessel 11 is 82 feet long and has a beam of 82 feet. In this preferred embodiment, the vessel 11 extends 73 feet above water in use. In this preferred embodiment, the draft (empty) is 3 feet and the draft (loaded) is 6 feet. In this preferred embodiment, the vessel 11 displaces approximately 6 tons (empty) and 250 tons (loaded), has a storage capacity of 80,000 gallons, and travels at a top speed of 14 knots. In this preferred embodiment, the electrical generator 25, is a 1000 kilowatt generator.

As for auxiliary systems, the vessel 11 preferably is provided with its own propulsion system 61 which is controlled by an onboard computer or by remote commands from a control center on land. Also, the vessel 11 preferably is provided with a navigation system 63, which may include GPS tracking, radar, sonar, video (visible and infrared), and equipment to measure environmental conditions such as wind speed, wind direction, air temperature, water temperature, salinity, and currents.

Preferably, the vessel 11 is controlled by a telemetric system 65 for remote operation via a satellite or VHF emergency controls, but also is capable of autonomous operation via a predetermined instruction set.

The control system provided to the vessel 11 allows for the operation and monitoring of the power system 16 and the hydrocarbon processor 27, according to optimal design parameters for the production of the hydrocarbons.

The power storage and regulation element 19 is connected to and supplies power to the various systems of the vessel 11, such as the processor 27, the onboard computer, and the various auxiliary systems.

Preferably, the vessel 11 is constructed of aluminum and plastic (PVC, HDPE, Shearfil, and Tefzel).

In use, the vessel 11 is positioned in a body of water, such as the ocean or a lake, to have access to a water source and a wind source. Wind blowing against the rotor blades 23 of the wind turbine 17 causes the rotatable shaft 21 of the wind turbine 17 to rotate to drive the electrical generator 25 to produce electrical energy. The electrical energy produced by the generator 25 is transferred to the power storage and regulation element 19 for storage and subsequent use by the vessel 11.

During use, electricity from the power storage and regulation element 19 is transferred to the electrolyzer 35 and the vacuum pump 50 to drive these units.

Vacuum pump 50 draws water from the body of water in which the vessel 11 is located and into and through a passageway extending along the central axis of the hollow mast 24 to the upper end portion of the mast 24, where the water is vaporized through flash distillation. The vaporized water is then condensed and fed to the electrolyzer 35. Prior to entering the electrolyzer 35, the condensed water absorbs carbon dioxide at the carbon dioxide interface 29. The electrolyzer 35 converts the water via electrolysis, into hydrogen and oxygen, and this hydrogen, oxygen, and the carbon dioxide absorbed by the condensed water fed to the electrolyzer 35 are then fed to the RWGS reactor 45, which converts the carbon dioxide and hydrogen in the presence of a catalyst into the RWGS effluent stream 47 which comprises carbon monoxide and water. The RWGS effluent stream 47 is then fed into the ethanation reactor 49, which converts RWGS effluent stream 47 in the presence of a catalyst into the product hydrocarbon.

The hydrocarbon product produced by the hydrocarbon processor 27 of the vessel 11 is fed from the ethanation reactor 49 via lines into storage containers 57, which may be periodically unloaded and used as an energy source, for example, a fuel for driving energy turbines for creating electricity.

The hydrocarbon produced in accordance with the invention is preferably ethanol, but other hydrocarbon products may be produced as desired. Exemplary of these other products are methanol, ethanated olefins (diesel), ethanated esters, and dimethylethane. Such products may be produced using appropriate catalysts in the hydrocarbon processor 27 as is known in the art, to create the appropriate reaction to produce the desired hydrocarbon product.

Exemplary catalysts include iron, copper, iridium, and combinations thereof.

Optionally, pumps may be provided along the lines in the processor 27 as needed when heavier hydrocarbons are being produced.

The vessel 11 may also be configured to collect the byproduct potable water produced by hydrocarbon processor 27.

Preferably, vessel 11 operates away from commercial traffic. The land-based operators may detect—via radar, sonar and video—the presence of other vessels, e.g. ships, from a considerable distance. If required, the vessel 11 may be programmed to detect approaching ships and move to avoid them, or the vessel 11 may be moved by the instructions from an operator. In the event of storms, the vessel 11 attempts first to reach safe waters. If this is impossible, the vessel 11 may submerge itself, if instructed to do so in deep water to avoid waves and other vessels. The vessel 11 preferably broadcasts continuously on both radar and sonar transponders while operating in the open sea.

An exemplary operating area is the Mid-Atlantic coastal area near New Jersey and Delaware. This area has proximity to energy users, favorable wind and sea conditions, and it is a large, relatively shallow area where tankers and freighters tend to stay in well-defined areas. The vessels 11 preferably are shallow-draft, preferably drawing only 6 feet when fully loaded, and may be positioned in areas too shallow for commercial cargo vessels to traverse, preferably areas of 50 feet or less. Generally, the vessels are positioned far enough off-shore to be invisible to beach resorts, preferably operating between 10 and 30 miles off-shore.

In a preferred embodiment, the vessel 11 is configured to possess a number of failsafe measures. If a vessel 11 loses the link to the control center, it may be programmed to immediately cease production, and attempts to re-establish a link via VHF. If this fails, the vessel 11 may be programmed to immediately go to station-keeping mode and to activate its transponders, lights and horns as needed. If no contact is made within four (4) hours or storm conditions occur while off-link, the vessel 11 may be programmed to submerge itself and deploy a transponder buoy.

Concerning a preferred overall design, the wind turbine 17 is a slow turning vertical axis machine design to be harmless to birds. It has an aluminum shaft 21, stainless steel rigging and Shearfil rotor blades 23. This is an environmentally inert, flexible material developed for the Apollo space suits. The wind turbine 17 stands 65 feet tall and rotates at 23 RPM at full power. It may also be lined with aluminum foil to make it highly visible to radar.

The vessel 11 preferably is illuminated by lights and has both sonar and radar transponders. The operator uses a television camera capable of transmitting images in both the visible and infra-red spectrum for a real-time image of the platform's location.

In a preferred embodiment the operator's display is overlaid with plots of other vessels, if nearby, and weather and sea data, such as temperature, wind speed, direction, humidity. Additional continuous data streams, for example data from the Rutgers Marine Research Center at Tuckahoe, N.J., LEO-15 and NDBC buoy 44009, are also integrated into the display.

The wind turbine 17 generates 1,300 HP at full power and all of this power may be made available through jetpumps, to propel the platform 11. The vessel 11 is a tele-operated/telemetric machine, similar to the Predator drones, and may have an added artificial intelligence function that allows it to report its condition and perform certain functions independently should the need arise. Telemetry is sent continuously in real time, via satellite internet connection, with conventional VHF back-ups. Under normal mode the vessel 11 goes to a location selected by the operator. This preferably is an area clear of commercial shipping and fishing, where the winds are suitable. Once on station, the vessel 11 holds within 100 yards of the preset location using thrusters to hold its position. During the next 12 to 48 hours the vessel 11 produces ethanol and then requests off-loading. When that time is near the vessel 11 moves to a rendezvous with a barge/tug where a crew transfers the hydrocarbon product, e.g. ethanol and brings the hydrocarbon product ashore. All off-loading is done under direct human presence. Once empty, vessel 11 returns to its station to repeat the process. Should bad weather be reported, the platform 11 may off-load to a barge and proceed to a safe harbor, or may move out of the storm path to some other operating area. In an emergency, the vessel 11 may submerge itself so as to not be a hazard to navigation and await retrieval after the storm passes. The vessel 11 can go to 200 feet and hold sufficient compressed air to both hold at that depth for 5 days and refill their ballast tanks to surface when the retrieval commands are received. For additional safety, the Coast Guard, may take over direct operation of the vessels to use as monitoring platforms, if desired.

The invention claimed is:

1. A floating vessel for producing hydrocarbons from wind energy, water, and air comprising:
   one or more containers having a chamber formed therein;
   a structural frame for interconnecting the one or more chambers;
   a power system disposed within or among the one or more of the containers, for producing, storing, and distributing power, the power system including:
   a wind turbine for harnessing the wind energy, the wind turbine having a rotatable shaft and one or more rotor blades connected to the rotatable shaft,
   an electrical generator mechanically coupled with the rotatable shaft for producing power when wind contacts the one or more rotor blades causing the rotatable shaft to rotate thereby producing power, and
   a power storage and regulation element, for regulating and storing the power produced by the generator;
   a hydrocarbon processor, the hydrocarbon processor including:
   a carbon dioxide interface for introducing carbon dioxide to the hydrocarbon processor,
   an electrolyzer adapted to receive power produced by the generator, and further adapted to convert water, via electrolysis, into hydrogen and oxygen, and provide a hydrogen effluent stream of hydrogen,
   a reverse water gas shift (RWGS) reactor adapted to receive the hydrogen effluent stream from the electrolyzer and a carbon dioxide stream containing carbon dioxide for converting the carbon dioxide and hydrogen, in the presence of a catalyst, into a RWGS effluent stream comprising carbon monoxide and water, and
   an ethanation reactor adapted to receive and convert the RWGS effluent stream, in the presence of a catalyst, into the hydrocarbon product; and
   a control system for regulating and monitoring the power system and the hydrocarbon processor.

2. The floating platform of claim 1, further comprising a telemetric system for remote operation and monitoring of the floating platform.

3. The floating platform of claim 1, further comprising a navigation and propulsion system for permitting the floating platform to traverse open waters.

4. The floating platform of claim 3, the navigation and propulsion system being adapted to be remotely operated and monitored.

5. A method for producing hydrocarbons, comprising the steps of:
   providing the floating vessel of claim 1,
   positioning the vessel in a water source,
   turning the wind turbine to effect generation of electricity in the generator,
   transferring electricity produced by the generator to the electrolyzer to enable the electrolyzer,
   electrolyzing water to produce hydrogen,
   feeding the hydrogen produced by the electrolyzer and carbon dioxide to the RWGS reactor to convert the hydrogen and carbon dioxide into a RWGS effluent stream of carbon monoxide and water, and feeding the RWGS effluent stream to the ethanation reactor to produce a hydrocarbon product.

6. A method for producing hydrocarbons, comprising:

turning a wind turbine to effect generation of electricity in a generator, transferring electricity produced by the generator to an electrolyzer to enable the electrolyzer, exerting a vacuum on a water source to extract water vapor, condensing the water vapor, electrolyzing water condensed from the water vapor to produce hydrogen, feeding the hydrogen produced by the electrolyzer and carbon dioxide to a reverse water gas shift (RWGS) reactor to convert the hydrogen and carbon dioxide into a RWGS effluent stream of carbon monoxide and water, and feeding the RWGS effluent stream to an ethanation reactor to produce a hydrocarbon product.

7. The method of claim 6, further comprising interfacing the condensed water with air to allow the condensed water with air to allow the condensed water to absorb carbon dioxide contained in the air.

* * * * *